US006651762B1

United States Patent
Hokanson et al.

(10) Patent No.: US 6,651,762 B1
(45) Date of Patent: *Nov. 25, 2003

(54) AC MOTORIZED WHEEL ARRANGEMENT

(75) Inventors: Paul Robert Hokanson, Girard, PA (US); Michael Doud Leisenring, Erie, PA (US); Maurice Frank Dalton, Erie, PA (US)

(73) Assignee: General Electric Company, Schenectady, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 09/643,409

(22) Filed: Aug. 22, 2000

Related U.S. Application Data

(63) Continuation of application No. 08/923,483, filed on Sep. 4, 1997, now Pat. No. 6,148,940.

(51) Int. Cl.[7] .................................................. B60K 1/02
(52) U.S. Cl. ...................................... 180/65.5; 180/65.1
(58) Field of Search ............................ 180/65.5, 65.6, 180/65.7, 65.8, 65.1

(56) References Cited

U.S. PATENT DOCUMENTS

| | | | | |
|---|---|---|---|---|
| 3,812,928 A | * | 5/1974 | Rockwell et al. | 180/65.5 |
| 3,892,300 A | * | 7/1975 | Hapeman et al. | 180/65.5 |
| 4,389,586 A | * | 6/1983 | Foster et al. | 180/65.5 |
| 4,647,805 A | * | 3/1987 | Flygare et al. | 180/65.5 |
| 5,127,485 A | * | 7/1992 | Wakuta et al. | 180/65.5 |
| 5,289,905 A | * | 3/1994 | Braschler | 180/65.5 |
| 5,633,544 A | * | 5/1997 | Toida et al. | 180/65.5 |
| 6,148,940 A | * | 11/2000 | Hokanson et al. | 180/65.5 |
| 6,148,941 A | * | 11/2000 | Hinton et al. | 180/65.5 |
| 6,328,123 B1 | * | 12/2001 | Niemann et al. | 180/65.5 |

* cited by examiner

Primary Examiner—Brian L. Johnson
Assistant Examiner—Jeffrey J Restifo
(74) Attorney, Agent, or Firm—Gerald W. Spinks

(57) ABSTRACT

An AC motorized wheel arrangement includes a wheel frame including a flange for attachment to a truck body; a wheel hub; roller bearings for supporting the wheel hub on the wheel frame; a shaft; an AC motor attached to a portion of the wheel frame facing an inboard side of the wheel for turning the shaft; a transmission attached to a portion of the wheel frame facing an outboard side of the wheel and connected to the shaft and the wheel hub for turning the wheel hub; and a service brake mounted between the wheel frame and the wheel hub. In a ventilation arrangement, two wheel frames are attached to opposite outer sides of and axle box and two alternating current motors are positioned in the axle box with each motor frame attached to one of the wheel frames. The motor frames include holes for permitting air from the axle box to enter the motors, and an air outlet housing is positioned between the two motors for receiving air from the two motors and directing air out a rear opening of the axle box.

19 Claims, 7 Drawing Sheets

AC MOTORIZED WHEEL ARRANGEMENT

CROSS-REFERENCE TO RELATED APPLICATION

The present application is a continuation application of U.S. patent application Ser. No. 08/923,483, filed Sep. 4, 1997, now U.S. Pat. No. 6,148,940, which is hereby incorporated by reference into the present disclosure.

BACKGROUND OF THE INVENTION

The present invention relates to alternating current (AC) driven motorized wheel assemblies that propel and retard off-highway vehicles.

In conventional direct current (DC) motorized wheel assemblies, DC motor rotors use a commutator upon which carbon brushes are held in position with brush holders attached to the motor to maintain a sliding contact and thus allow electrical power to be fed into the rotor for torque production. The brushes and commutator are high maintenance parts of the DC motor and need to be readily accessible for regular replacement and service. Therefore, DC motors are often positioned in the center of the tires with commutators at the outboard end for easy maintenance access to the brushes and removal of the rotor. Since the magnet frame of the DC motor is thick steel, it serves as both the motor frame structure and the wheel frame structure. However, locating the motor in the center of the tire limits the maximum diameter of the rotor and thus puts severe limits on the maximum power capability of the motor.

With conventional DC motors, a hollow cylinder (an axle box) provides a mounting structure for the wheels and serves as an air plenum for cooling air for the wheel motors which originates from remote blowers and exits through the wheels.

SUMMARY OF THE INVENTION

It is therefore seen to be desirable to have a motorized wheel assembly for propelling and retarding off-highway vehicles with lower costs and maintenance requirements. An AC induction motor transfers electrical power to a rotor via electrical induction and therefore needs no commutator or brushes. As compared with a DC motor, an AC motor requires much less maintenance and therefore can be placed in a location where frequent access is not necessary. The cost of the AC motor can be minimized by using a rotor diameter which is as large as possible. In a preferred embodiment of the present invention, AC motors are moved inboard into the axle box where cooling air is available and the diameter of the motor is no longer as restricted. The transmission (which in one embodiment includes a double reduction gear unit) is placed outboard of the tires with a shaft connecting it to the motor allowing the hub diameter and hub bearing diameters to be minimized. Since the limit on motor diameter has been relieved, a higher power capability motorized wheel can be provided with a lower maintenance motor.

With the location of the motors and the transmission in the present invention, air cannot pass through the wheels because the transmission blocks the outlet. Therefore, another method of cooling the motors is needed. The structural integrity of the axle box is very important because the axle box supports two-thirds of the truck's weight and all of the torque reaction. Adding additional air outlet holes or performing any other modifications can affect the structural integrity of the axle box.

In one embodiment of the present invention, air holes are provided in flanges supporting the motor so that cooling air (which enters the axle box from an air inlet duct) can enter the motor from the outboard side and exit the motors into the center of the axle box before being ducted out through an existing service access opening in the rear of the axle box. In this embodiment, the motors can be cooled without adding additional holes to the axle box. Thus, by using the air inlet duct and service access hole in the axle box which already exist for DC motorized wheels, the present invention does not affect the axle box structural design and thus does not create a risk of weakening the structural integrity of the axle box.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Figure 1:
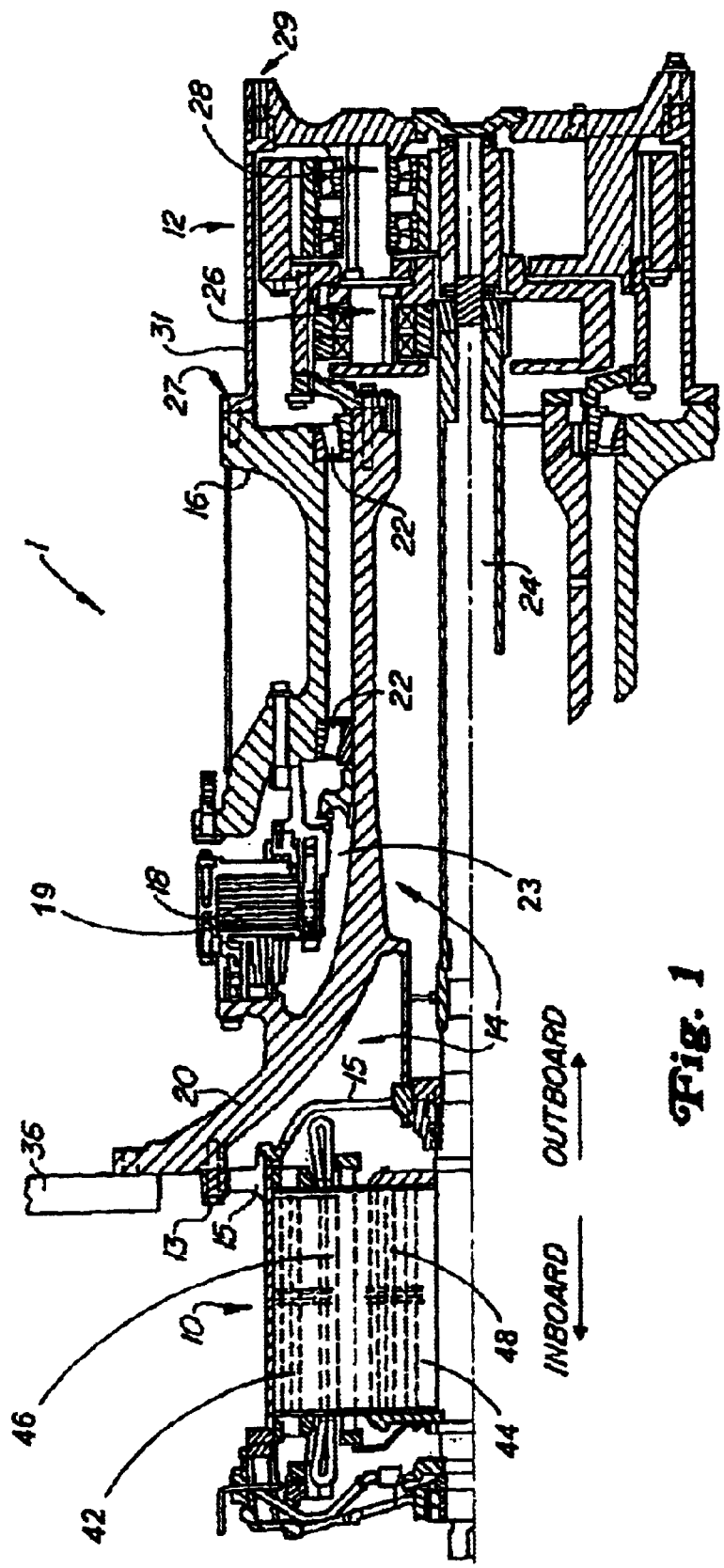
FIG. 1 is a sectional side view of one embodiment of the present invention.
Figure 2:
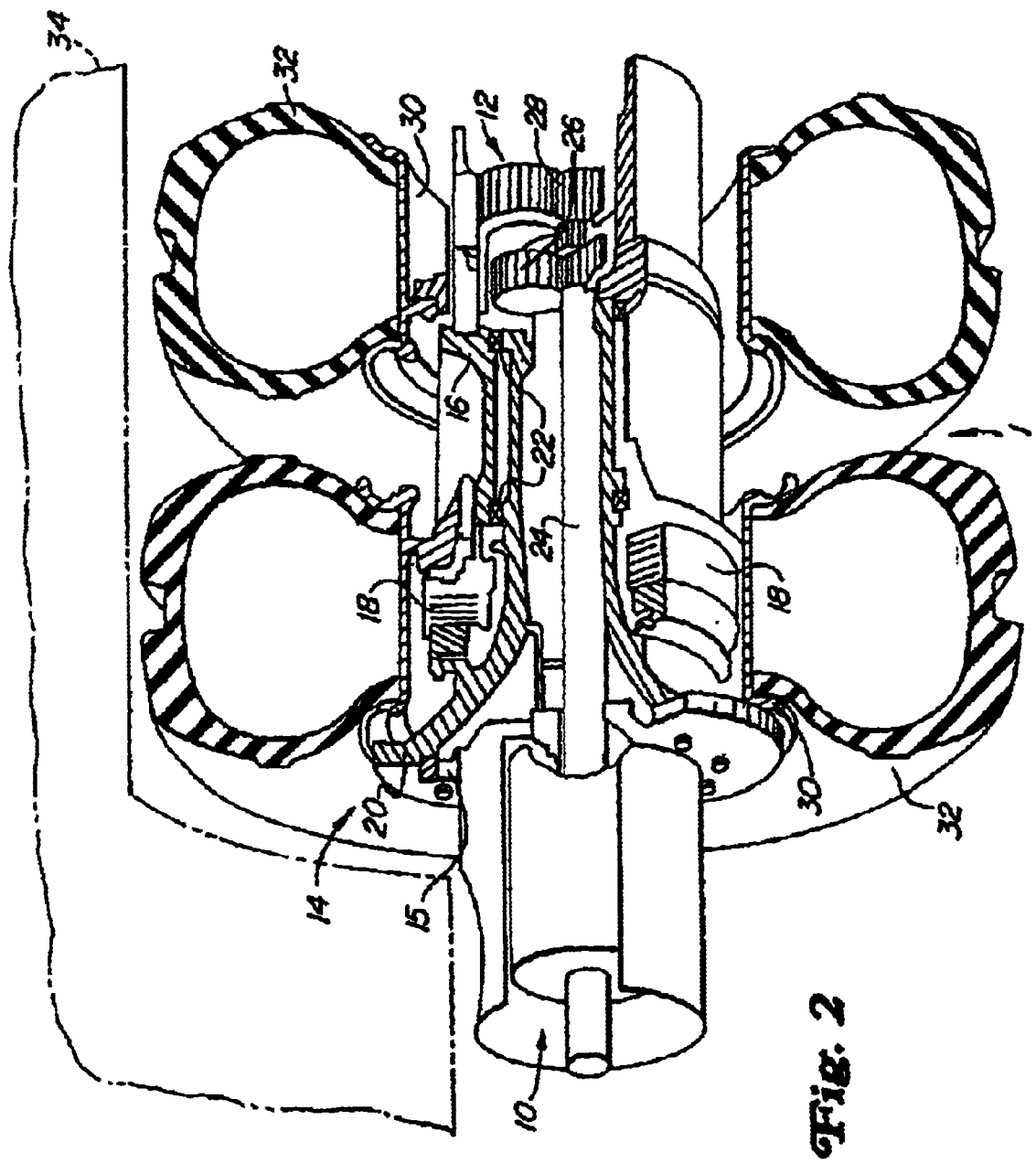
FIG. 2 is a partial cut out and perspective view of the embodiment of FIG. 1.

FIG. 1 is a sectional side view of one embodiment of the present invention, and FIG. 2 is a partial cut out and perspective view of the embodiment of FIG. 1. An AC motorized wheel arrangement 1 of the present invention includes an AC motor 10, a transmission 12, a wheel frame 14, a wheel hub 16, and a service brake 18. The AC motor 10 has a stator 42 with a stator coil 46, and a rotor 44 with a rotor coil 48. FIGS. 1 and 2 illustrate that in the apparatus of the present invention, the outer diameter of the stator coil 46 is at least as large as the innermost diameter of the wheel hub 16. The service brake 18 has an annular brake disk 19. FIGS. 1 and 2 further illustrate that, in the apparatus of the present invention, the inner diameter of the brake disk 19 is at least as great as the innermost diameter of the wheel hub 16. A truck with which the motorized wheel will be used is shown in block form as element 34 in FIG. 2.

A single motorized wheel is shown in FIGS. 1 and 2. In practice, two motorized wheels are used with the other, unshown motorized wheel substantially similar to a mirror image of that shown in FIG. 1. For purposes of the present invention, as shown in FIG. 1, the term "outboard side" with respect to a motorized wheel, means a portion of the motorized wheel in the direction of the outboard arrow (away from a center line of the truck) and the term "inboard side" refers to a portion of the motorized wheel in the direction of the inboard arrow.

Wheel frame 14 supports the motorized wheel components and includes a flange 20 that can be bolted directly to an axle box 36 of the truck. In one embodiment, a motor frame 15 of the AC motor is mounted with bolts 13 on a portion of the wheel frame on the inboard side of the wheel, and the transmission is mounted to a portion of the wheel frame on the outboard side of the wheel. The wheel frame provides a standard interface to the truck and thus permits easy removal and replacement of the motorized wheel assembly from the truck.

Roller bearings 22 are situated between the wheel frame and the wheel hub for supporting the wheel hub and allowing it to turn on the outside of the wheel frame. The wheel hub is turned by the transmission. Rims 30 and tires 32 are mounted to and rotate with the wheel hub.

The service brake 18 is mounted between the frame flange 20 and wheel hub 16. This provides two important features: (1) the brake 18 is carried in a protected location between the rotating portion (wheel hub 16) and the stationary portion (wheel frame 14) of the wheel and (2) the brake 18 be is positioned for being oil cooled, with the wheel frame 14 geometry in the area of the brake 18 providing an annular reservoir 23 of cooling oil for the brake 18.

The AC motor converts electrical energy to mechanical energy that turns a shaft 24 connected to the transmission. In one embodiment the transmission comprises a double reduction transmission, and the shaft is connected to a high speed portion 26 of transmission 12. The high speed portion of the transmission then turns the low-speed portion 28 of the transmission that is bolted to the wheel hub with bolts 27 and 29 through a torque tube 31.

Figure 3:
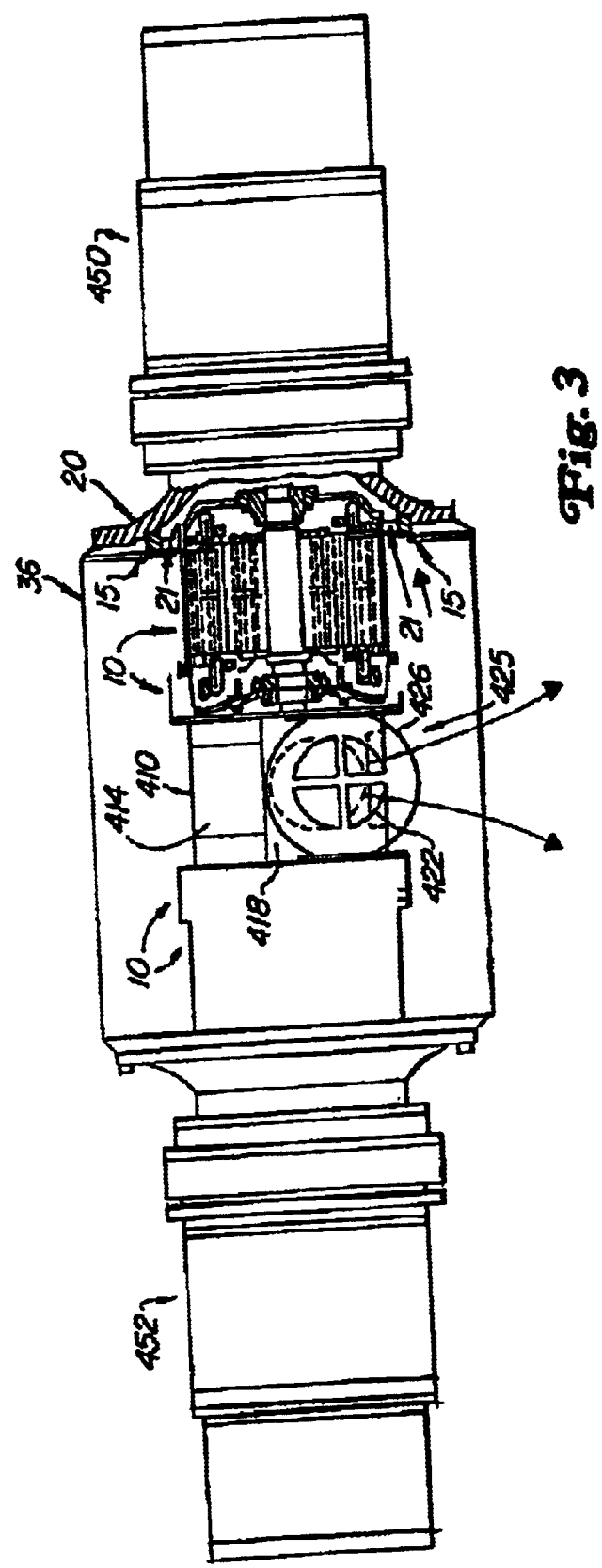
FIGS. 3–6 are respective rear, side, perspective, and top views of a cooling embodiment of the present invention.
Figure 4:
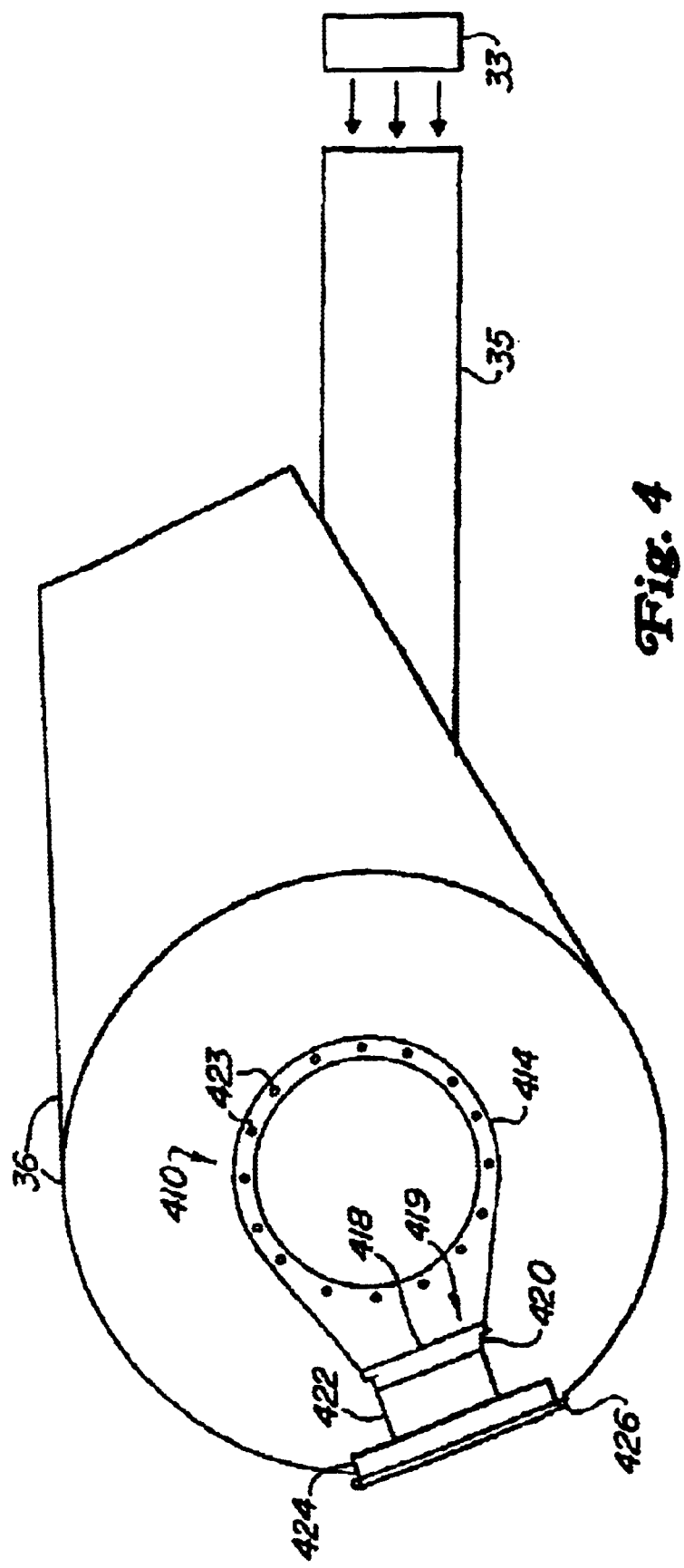
Figure 5:
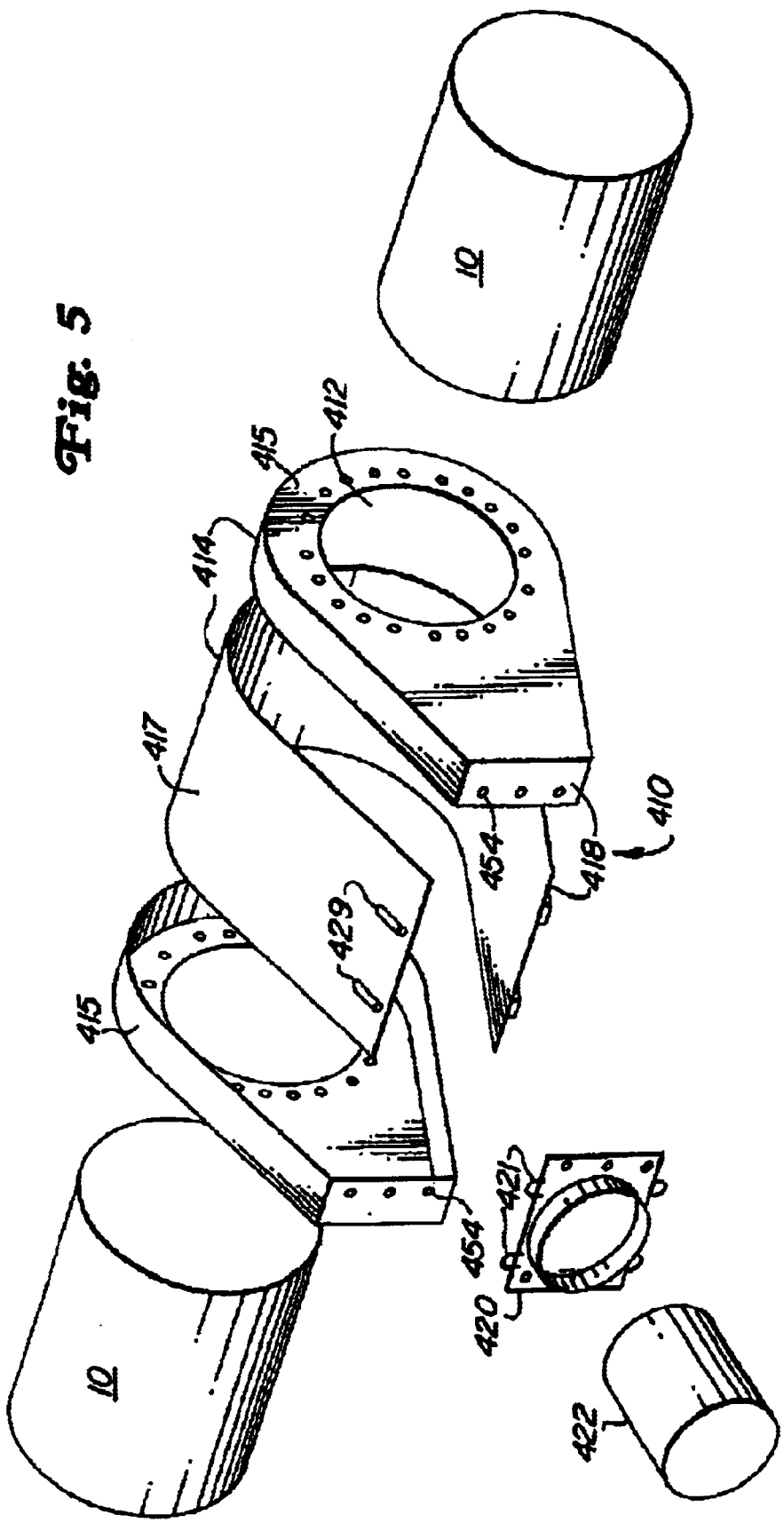
Figure 6:
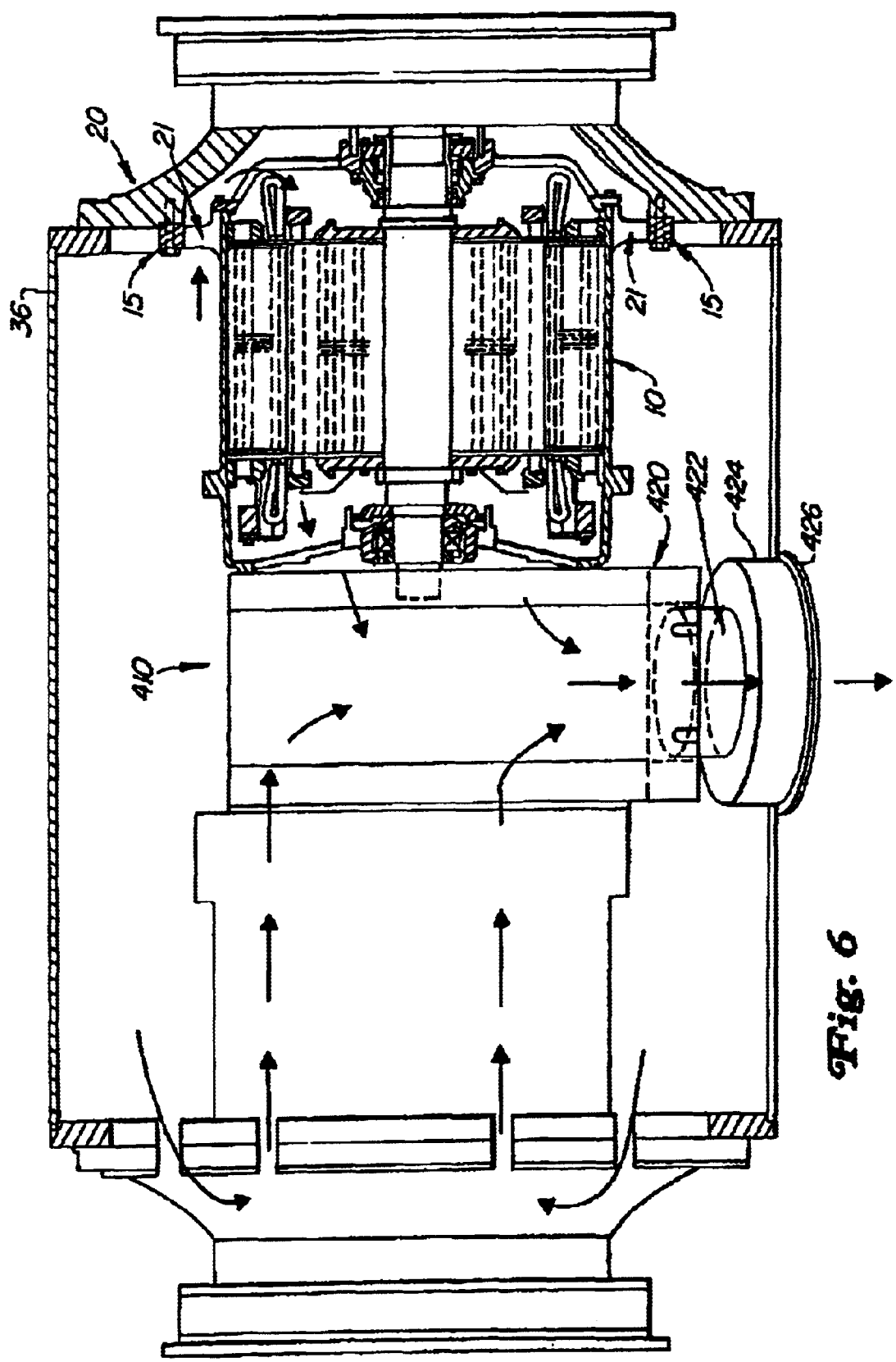
Figure 7:
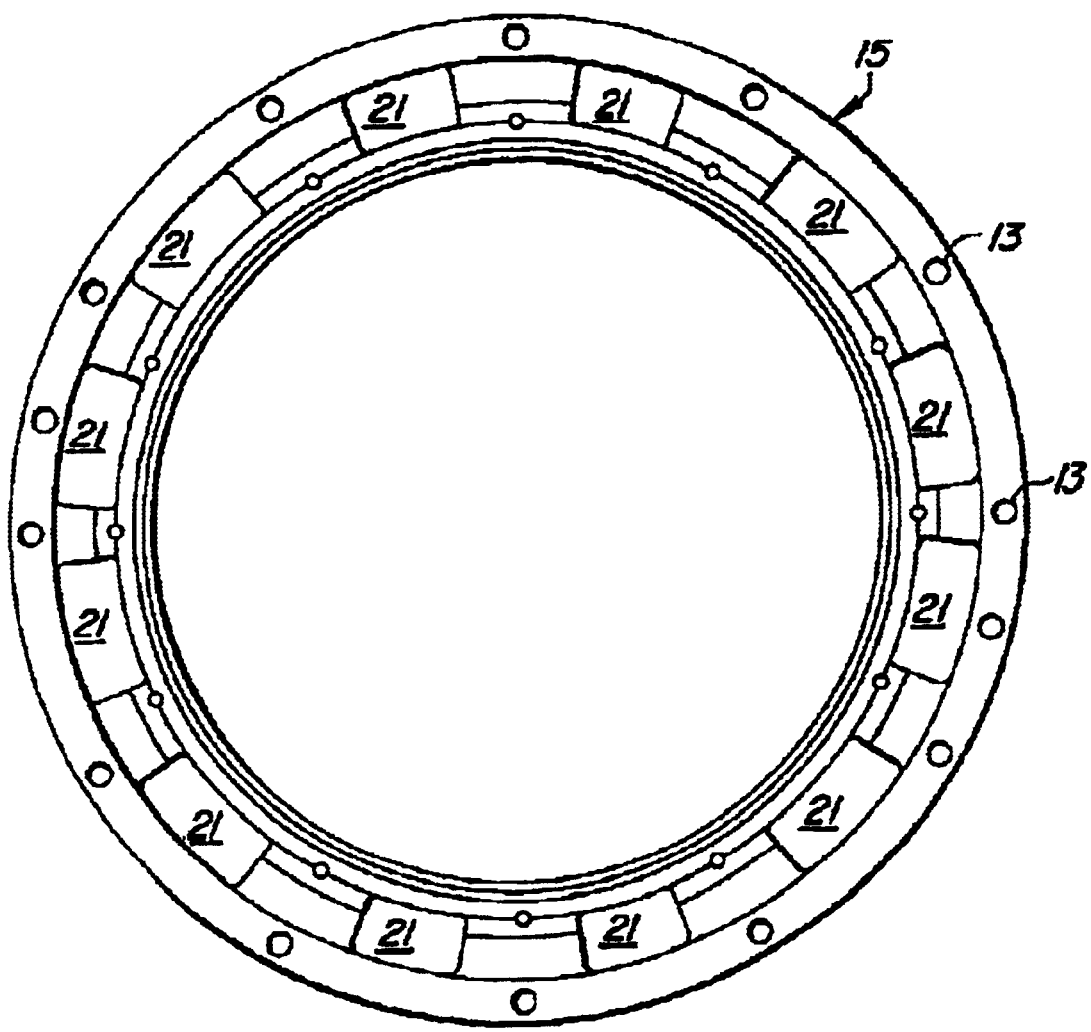
FIG. 7 is a side view of a portion of a motor frame having cooling air holes.

FIGS. 3–6 are respective rear, side, perspective, and top views of a cooling embodiment of the present invention. As shown in FIG. 4, one or more blowers 33 in the front of the truck supply cooling air to axle box 36 through air inlet duct 35. As shown in FIGS. 3 and 6, cooling air from the axle box enters the motors through air holes 21 which are provided in motor frames 15 (which are secured with bolts 13 to flanges 20 of frames 14 of wheels 450 and 452). FIG. 7 is a side view of a portion of motor frame 15 with cooling air holes 21. Air enters the motors from the outboard ends of the motors and passes through motors 10 toward the inboard ends. The motors are attached to an air outlet housing element 410 which directs the air through an opening 425 in the rear of the axle box.

In conventional DC motors, opening 425 is provided for service access to the axle box and is typically covered with a solid cover. In the present invention, the cover can be left off, or, as preferred, a cover 426 may comprise a screen or grid which permits the passage of air.

As shown in FIGS. 4 and 5 the outlet housing preferably includes a cylindrical portion 414 having two circular openings 412 corresponding to the two motors. The outlet housing can be attached to the motors with any appropriate device. In one embodiment, the motors are bolted to the outlet housing with bolts 423. The outlet housing can be tapered to provide a smaller air outlet opening 419 which is shown as a rectangular portion 418. In one embodiment, the outlet housing can be angled in a downward direction. Tilting the outlet housing downwards is useful for preventing debris from falling into the air outlet from the truck body or from the top of the axle box.

The rectangular portion of the outlet housing can be attached to a hose 422 by a housing coupler 420 which can further narrow the available air path, and the hose can be coupled by an axle box coupler 424 to create an opening having the same diameter as the axle box opening. In one embodiment, outlet housing 410 and couplers 420 and 424 comprise sheet steel, hose 422 comprises a flexible air duct hose, and cover 426 comprises steel.

As shown in FIG. 5, in one embodiment outlet housing 410 may comprise three portions: two side cowlings 415 and a center wrap portion 417. This structure provides easy access for bolting the cowlings 415 to the frames of motors 10. Housing coupler 420 may be secured with bolts 454 to the side cowlings. Center wrap portion 417 may include tabs 429 which fit through loops 421 of the housing coupler to secure the center wrap portion of the outlet housing to the housing coupler.

Although hose 422 and couplers 420 and 424 are shown as having circular cross sections, the present invention does not require a specific shape for the cross sections. Furthermore, the air path does not need to be narrowed in the manner shown in FIGS. 3–6.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An electric motor powered wheel arrangement having increased power capacity, comprising:

a wheel frame having an inboard end, and an outboard end, the wheel frame being adapted to attach at its inboard end to a body of a vehicle;

a wheel hub rotatably mounted on the wheel frame so as to rotatably support the wheel hub directly on the wheel frame;

an electric motor having a central shaft for driving the wheel hub, the motor being mounted to the wheel frame at a position entirely inboard of the wheel hub, the motor having a housing receiving a motor stator and rotor, the housing of the electric motor being ventilated for flow of cooling air through the housing past the stator and rotor;

a transmission secured to the wheel frame and operatively connected to the wheel hub; and a drive shaft connected between the motor shaft and the transmission, that delivers power from the motor to the transmission;

wherein the stator coil and rotor coil of the electric motor are positioned substantially inboard of the inboard end of the wheel frame; and wherein the electric motor has a stator coil with an outer diameter that is at least as large as the innermost diameter of the wheel hub.

2. The wheel arrangement of claim 1, wherein the electric motor is secured to the wheel frame with a first portion of the stator coil of the motor projecting into a hollow interior of the wheel frame, and a second portion of the stator coil of the motor projecting in the inboard direction beyond the inboard end of the wheel frame, wherein the second portion of the stator coil of the motor has a larger outer diameter than the first portion.

3. The wheel arrangement of claim 1, wherein the outer diameter of the stator coil of the motor is larger than the innermost diameter of the wheel hub.

4. The wheel arrangement recited in claim 1, wherein the outboard end of the motor housing is open to the flow of cooling air.

5. The wheel arrangement recited in claim 1, wherein the electric motor is an AC motor.

6. An electric motor powered wheel arrangement having increased braking capacity, comprising:

a wheel frame having an inboard end and an outboard end, wherein the wheel frame is adapted to attach at its inboard end to a body of a vehicle;

a wheel hub rotatably supported directly on the wheel frame;

an electric motor for driving the wheel hub, the motor being mounted to the wheel frame at a position entirely inboard of the wheel hub;

a transmission secured to the wheel frame and operatively connected to the wheel hub;

a drive shaft connected between the motor and the transmission, that delivers power from the motor to the transmission; and a generally annular brake disk positioned radially outwardly of and surrounding the wheel frame and positioned entirely inboard of the wheel hub, the brake disk having a radial inner diameter and a radial outer diameter, the inner diameter of the brake disk being at least as great as the innermost diameter of the wheel hub.

7. The wheel arrangement of claim 6 wherein the inner diameter of the brake disk is larger than the innermost diameter of the wheel hub.

8. An electric motor powered wheel arrangement, comprising:

a wheel frame having an inboard end and an outboard end, wherein the wheel frame is adapted to attach at its inboard end to a body of a vehicle;

a wheel hub disposed around the wheel frame and rotatably supported directly on the wheel frame;

an electric motor for driving the wheel hub, the motor being mounted to the wheel frame at a position entirely inboard of the wheel hub;

a transmission secured to the wheel frame and operatively connected to the wheel hub;

a drive shaft connected between the motor and the transmission, that delivers power from the motor to the transmission; and an oil cooled annular brake disk having a generally annular oil reservoir that holds brake cooling oil, the brake disk and the oil reservoir being positioned annularly around the wheel frame and positioned entirely inboard of the wheel hub.

9. A motorized wheel arrangement, comprising:

first and second wheel frames adapted to be secured to a vehicle body;

first and second wheel hubs rotatably supported by the first and second wheel frames, respectively;

first and second motors associated with the first and second wheel frames, respectively;

first and second transmissions operatively connected to the first and second motors, respectively; and an air outlet housing positioned between the first and second motors;

wherein the housing surrounds at least a portion of each of the motors; and wherein the housing receives a stream of cooling air exiting each of the motors, the housing directing the air past the surrounded portion of each of the motors and discharging the heated air therefrom to cool the motors.

10. A vehicle having a plurality of electric motor powered wheel arrangements, each arrangement comprising:

a wheel frame having an inboard end and an outboard end, wherein the wheel frame is adapted to attach at its inboard end to the a body of a vehicle;

a wheel hub disposed around the wheel frame and rotatably supported directly on the wheel frame;

an electric motor having a central shaft for driving the wheel hub, the motor being mounted to the wheel frame at a position entirely inboard of the wheel hub, the motor having a housing receiving a motor stator and rotor, the housing of the electric motor being ventilated for flow of cooling air through the housing past the stator and rotor;

a transmission secured to the wheel frame and operatively connected to the wheel hub; and a drive shaft connected between the motor and the transmission, that delivers power from the motor to the transmission;

wherein the stator coil and rotor coil of the electric motor are positioned substantially inboard of the inboard end of the wheel frame; and wherein the electric motor has a stator coil with an outer diameter that is at least as large as the innermost diameter of the wheel hub.

11. The vehicle of claim 10, wherein the electric motor is secured to the wheel frame with a first portion of the stator coil of the motor projecting into a hollow interior of the wheel frame, and a second portion of the stator coil of the motor projecting in the inboard direction beyond the inboard end of the wheel frame, wherein the second portion of the stator coil of the motor has a larger outer diameter than the first portion.

12. The vehicle of claim 10, wherein the motor has stator coils with an outer diameter larger than the innermost diameter of the wheel hub.

13. The vehicle recited in claim 10, wherein the outboard end of the motor housing is open to the flow of cooling air.

14. The vehicle recited in claim 10, wherein the electric motor is an AC motor.

15. A vehicle having a plurality of electric motor powered wheel arrangements, each arrangement comprising:

a wheel frame having an inboard end and an outboard end, wherein the wheel frame is adapted to attach at its inboard end to a body of a vehicle;

a wheel hub disposed around the wheel frame and rotatably supported directly on the wheel frame;

an electric motor that drives the wheel hub, the motor being mounted to the wheel frame at a position entirely inboard of the wheel hub;

a transmission secured to the wheel frame and operatively connected to the wheel hub;

a drive shaft connected between the motor and the transmission, that delivers power from the motor to the transmission; and a generally annular brake disk positioned radially outwardly of and surrounding the wheel frame and positioned entirely inboard of the wheel hub, the brake disk having an inner diameter and an outer diameter with the inner diameter of the brake disk being at least as great as the innermost diameter of the wheel hub.

16. The vehicle of claim 15, wherein the inner diameter of the brake disk is larger than the innermost diameter of the wheel hub.

17. A vehicle having a plurality of electric motor powered wheel arrangements, each arrangement comprising:

a wheel frame having an inboard end and an outboard end, wherein the wheel frame is adapted to attach at its inboard end to a body of a vehicle;

a wheel hub disposed around the wheel frame and rotatably supported directly on the wheel frame;

an electric motor for driving the wheel hub, the motor being mounted to the wheel frame at a position entirely inboard of the wheel hub;

a transmission secured to the wheel frame and operatively connected to the wheel hub;

a drive shaft connected between the motor and the transmission, that delivers power from the motor to the transmission; and an oil cooled annular brake disk having a generally annular oil reservoir holding brake cooling oil, the brake disk and the oil reservoir being positioned annularly around the wheel frame and positioned entirely inboard of the wheel hub.

18. A vehicle having a plurality of motorized wheel arrangements, each arrangement comprising:

first and second wheel frames adapted to be secured to a vehicle body;

first and second wheel hubs rotatably supported by the first and second wheel frames, respectively;

first and second motors associated with the first and second wheel frames, respectively;

first and second transmissions operatively connected to the first and second motors, respectively; and an air outlet housing positioned between the first and second motors;

wherein the housing surrounds at least a portion of each of the motors; and wherein the housing receives a stream of cooling air exiting each of the motors, the housing directing the air past the surrounded portion of each of the motors and discharging the heated air therefrom to cool the motors.

19. An electric motor powered wheel arrangement having increased power capacity, comprising:

a wheel frame having an inboard end, and an outboard end, the wheel frame being adapted to attach at its inboard end to a body of a vehicle;

a wheel hub rotatably mounted on the wheel frame so as to rotatably support the wheel hub directly on the wheel frame;

an electric motor having a central shaft for driving the wheel hub, the motor being mounted to the wheel frame at a position entirely inboard of the wheel hub, a substantial portion of the electric motor projecting in the inboard direction from the inboard end of the wheel frame;

a transmission secured to the wheel frame and operatively connected to the wheel hub, the transmission being entirely positioned outboard of the wheel frame and outboard of the wheel hub;

a drive shaft connected between the motor shaft and the transmission, that delivers power from the motor to the transmission; and a generally annular brake disk positioned radially outwardly of and surrounding the wheel frame and positioned entirely inboard of the wheel hub;

wherein the inner diameter of the brake disk is at least as great as the innermost diameter of the wheel hub;

wherein the electric motor has an outer diameter that is larger than the innermost diameter of the wheel hub; and wherein the transmission has an outer diameter that is larger than the innermost diameter of the wheel hub.

* * * * *